US008834102B2

(12) United States Patent
Bremond et al.

(10) Patent No.: US 8,834,102 B2
(45) Date of Patent: Sep. 16, 2014

(54) INSTALLATION FOR CONVERTING HYDRAULIC ENERGY, AND A METHOD OF CONTROLLING SUCH AN INSTALLATION

(75) Inventors: Jacques Bremond, Saint-Egreve (FR); Joel Louis Pierre Marin, Claix (FR); Farid Mazzouji, Vourey (FR); Daniele Bazin, Voiron (FR)

(73) Assignee: ALSTOM Renewable Technologies, Grenoble (FR)

( * ) Notice: Subject to any disclaimer, the term of this patent is extended or adjusted under 35 U.S.C. 154(b) by 617 days.

(21) Appl. No.: 13/147,427

(22) PCT Filed: Feb. 17, 2010

(86) PCT No.: PCT/FR2010/050268
§ 371 (c)(1),
(2), (4) Date: Aug. 2, 2011

(87) PCT Pub. No.: WO2010/094887
PCT Pub. Date: Aug. 26, 2010

(65) Prior Publication Data
US 2011/0293400 A1 Dec. 1, 2011

(30) Foreign Application Priority Data
Feb. 18, 2009 (FR) .................................. 09 51068

(51) Int. Cl.
*F03B 3/02* (2006.01)
*F03B 3/18* (2006.01)
*F03B 11/00* (2006.01)

(52) U.S. Cl.
CPC ... *F03B 3/18* (2013.01); *F03B 3/02* (2013.01); *Y02E 10/226* (2013.01); *F05B 2250/34* (2013.01); *F03B 11/00* (2013.01); *Y02E 10/223* (2013.01); *F05B 2240/12* (2013.01); *F05B 2250/35* (2013.01); *Y10S 415/91* (2013.01)

USPC .......................................... 415/150; 415/910

(58) Field of Classification Search
USPC .............. 415/148, 149.1, 150, 155, 159, 160, 415/910
See application file for complete search history.

(56) References Cited

U.S. PATENT DOCUMENTS 2,306,742 A * 12/1942 Moody ......................... 415/160
3,237,563 A * 3/1966 Hartland ....................... 415/159
4,017,211 A 4/1977 Alestig
2004/0037698 A1 2/2004 Gokhman

FOREIGN PATENT DOCUMENTS

CN 1369036 A 9/2002
(Continued)

OTHER PUBLICATIONS

Grien H: "Vibration Phenomena in Francis Turbines: Their Causes and Prevention" Escher Wyss News, Escher Wyss, Zurich, CH, vol. 54/55, No. 1, Jan. 1, 1981, pp. 37-42, XP008018462 ISSN: 0367-1402.

*Primary Examiner* — Richard Edgar
(74) *Attorney, Agent, or Firm* — Buchanan Ingersoll & Rooney PC

(57) ABSTRACT

The invention relates to a unit comprising a hydraulic turbine (1), a duct (5) leading a forced flow of water to the turbine, a duct (8) discharging the outgoing flow from the turbine and vanes (20) for guiding the flow through the discharge duct. Each guide vane (20) is able to rotate about an axis ($x_{22}$) secant to the wall (84) of the discharge duct. Means (30) are provided for controlling the angular position of the vane (20) about its axis of rotation ($x_{22}$). Each guide vane (20) can also be retracted into the wall (84) of the discharge duct (8), and means (21) are provided for adjusting the extent to which they are withdrawn into the wall.

11 Claims, 4 Drawing Sheets

(56) References Cited

FOREIGN PATENT DOCUMENTS

| | | | |
|---|---|---|---|
| FR | 2300909 A | 2/2004 |
| GB | 799013 A | 7/1958 |
| JP | 52 066128 A | 6/1977 |
| JP | 57 108468 A | 7/1982 |
| JP | 4 063969 A | 2/1992 |

* cited by examiner

INSTALLATION FOR CONVERTING HYDRAULIC ENERGY, AND A METHOD OF CONTROLLING SUCH AN INSTALLATION

The present invention relates to an installation for converting hydraulic energy into electrical or mechanical energy, such an installation including a hydraulic turbine, a feed duct for feeding a forced flow of water to the turbine, and a discharge duct for removing said flow when it exits from the turbine.

In known installations, the flow downstream from the wheel or "runner" of a turbine fluctuates as a function of the operating point of the turbine, which operating point depends, inter alia, on the flow rate of water fed to the turbine. At certain operating points, vortices or swirling turbulence, generally referred to as "vortex ropes" tend to form and cause fluctuations in pressure and/or in power.

In response to that problem, it is known, for example from WO-A-2005/038243, that the wheel of a Francis turbine can be equipped with a tip having two surfaces, respectively convergent and divergent going towards an axis of rotation of the wheel, thereby considerably limiting turbulence. However, under certain flow conditions, turbulence remains.

In order to mitigate that loss of efficiency, it is proposed, in US-A-2007/0009352, to provide retractable fins. Those retractable fins are not adapted to all of the operating points of a turbine and, under certain operating conditions, their impact on the efficiency of the installation is very negative.

It is known from JP-A-57 108468 that a moving fin can be mounted to pivot in rotation above a stationary fin in a discharge duct for removing the flow exiting from a turbine. The stationary fin interferes with the flow, at least under certain flow conditions.

In addition, cavitation problems can occur with known equipment.

An object of the invention is, more particularly, to remedy those drawbacks by proposing an energy conversion installation of the above-mentioned type in which the flow passing through the discharge duct can be stabilized, without reducing the efficiency of the installation at the various operating points thereof.

To this end, the invention provides an installation of the above-mentioned type in which each guide fin is mounted to pivot in rotation about an axis that intersects the wall of the discharge duct, the installation being provided with means for controlling the angular position of the fin about its pivot axis, while each pivotally moving fin is retractable into the wall of the discharge duct, and while the installation is provided with means suitable for adjusting the extent to which the fin is retracted into the wall.

By means of the invention, it is possible to adapt the angular positioning of the guide fins in such a manner than they project relative to the wall of the discharge duct or draft duct, while taking account of the direction of any swirl component of the flow exiting from the turbine.

In advantageous but non-essential aspects of the invention taken in any technically feasible combination, such an installation may incorporate one or more of the following characteristics:

- the control means are suitable for setting the angular position of the guide fin as a function of at least one parameter representative of the flow;
- the or each pivotally moving fin is removable from the wall of the discharge duct, inside said duct; in a variant, the installation is further provided with a gallery giving access to the outside face of the wall of the discharge duct, and the or each fin is removable from said wall, from said gallery;
- each fin is secured to a piston mounted to slide parallel to the pivot axis of the fin, relative to a part fastened to the wall, while a subassembly comprising the fin and the piston is mounted to be pivotable in rotation about the pivot axis of the fin, and while said subassembly further comprises means for co-operating with drive means for driving the subassembly in rotation about the pivot axis of the fin;
- each moving fin extends on either side of its pivot axis; and
- the installation is provided with a plurality of pivotally moving guide fins, each of which is mounted to pivot about an axis that intersects the wall of the discharge duct, and the control means act in grouped manner on the guide fins; in a variant, the control means act in individualized manner on the guide fins.

The invention also provides a method that can be implemented with an installation as mentioned above, and, more specifically, a method of controlling an installation for converting hydraulic energy into electrical or mechanical energy, which installation comprises a hydraulic turbine a feed duct for feeding a forced flow of water to the turbine, a discharge duct for removing the flow exiting from the turbine, and at least one guide fin for guiding the flow through the discharge duct, said method being characterized in that it comprises a step consisting in controlling the angular position, about an axis that intersects the wall of the discharge duct, of each guide fin for guiding the flow through the discharge duct, and a step consisting in controlling the extent to which each moving fin is retracted into the wall of the discharge duct.

This method may incorporate one or more of the following characteristics that are advantageous and optional:

- the angular position of the fin is controlled as a function of at least one parameter representative of the flow, in particular as a function of the flow rate of the flow;
- the installation is provided with a plurality of fins distributed over the wall of the discharge tube and the position of the fins is controlled in grouped manner. In a variant, the position of each fin is controllable individually; and
- the extent to which each moving fin is retracted into the wall of the discharge duct is controlled by feeding or by not feeding pressurized water coming from the feed duct to a chamber provided in a body that is part of a subassembly, and defined by a piston that is secured to the fin.

The invention can be better understood and other advantages of the invention appear more clearly from the following description of two embodiments of an installation that complies with the principle of the invention and of its control method, the description being given merely by way of example and with reference to the accompanying drawings, in which.

Figure 1:
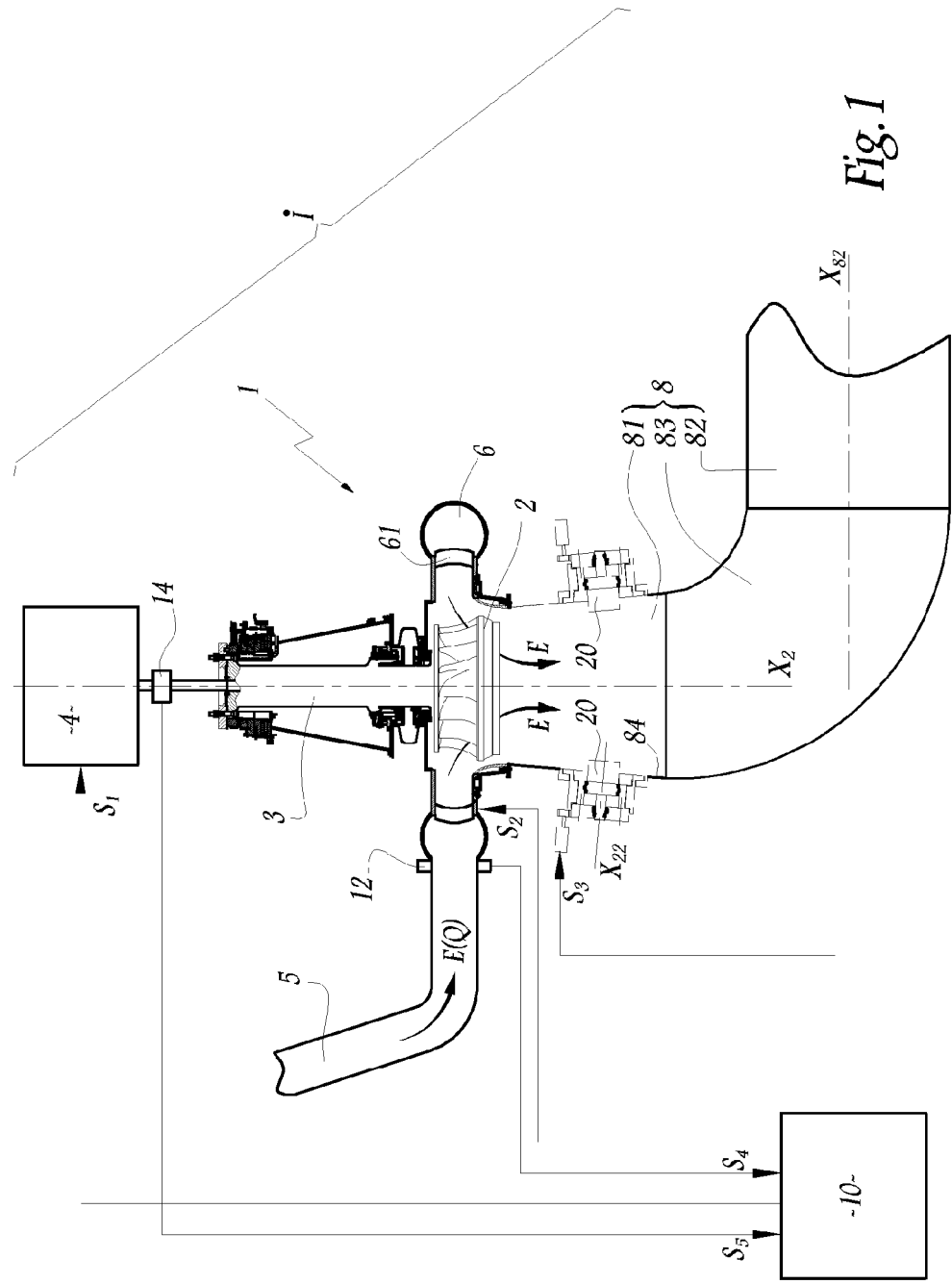
FIG. 1 is a diagrammatic view in axial section, showing the principle of a first embodiment of an installation of the invention.

The installation I shown in FIGS. 1 to 6 includes a turbine 1 of the Francis type having its wheel or "runner" 2 designed to be rotated about a vertical axis $X_2$ by a forced flow of water E coming from an impoundment of water (not shown). A shaft 3 mounted to rotate with the wheel 2 is coupled to an alternator 4 that delivers AC current to a network or grid (not shown) as a function of the rotation of the wheel 2. The installation I thus makes it possible to convert hydraulic energy from the flow E into electrical energy. The installation I may include a plurality of turbines 1 fed from the impoundment of water.

In a variant, the shaft 3 may be coupled to a mechanical assembly, in which case the installation I converts hydraulic energy from the flow E into mechanical energy.

A feed duct 5 makes it possible to bring the flow E to the wheel 2 and extends between the impoundment of water and a casing 6 equipped with wicket gates 61 that regulate the flow E.

A duct 8 is provided downstream from the turbine 1 so as to remove the flow E and so as to return it to a river channel from which the impoundment is fed. This discharge duct 8 is sometimes referred to as a "draft tube" or "draft duct".

A control unit 10 is provided for controlling the turbine 1 as a function, in particular, of the electricity needs of the network fed from the alternator 4, and of the flow rate of water available for the flow E. The unit 10 is capable of defining a plurality of operating points of the installation I and of sending control signals $S_1$ and $S_2$ respectively to the alternator 4 and to the wicket gates 61.

The duct 8 has an upstream portion 81 that is substantially vertical, frustoconical, and centered on the axis of rotation $X_2$ of the wheel 2. The duct 8 also has a downstream portion 82 centered on a substantially horizontal axis $X_{82}$. The axis $X_{82}$ is substantially horizontal in that it forms an angle with a horizontal plane that is less than 20°. In practice, the axis $X_{82}$ may be inclined slightly upwards in the direction of the flow E. A 90° bend 83 interconnects the portions 81 and 82 of the duct 8.

In order to stabilize the flow E after it has passed through the wheel 2, the upstream portion 81 of the duct 8 is provided with a plurality of fins 20 that project from the wall 84 of the upstream portion 81, towards the axis $X_2$. Said fins 20 are designed to be swept over by the portion of the flow E that, on exiting from the wheel 2, flows along the wall 84. Said fins thus influence the flow E through the discharge or draft duct 8.

FIG. 1, which is a section view on a vertical plane including the axis $X_2$, shows two fins 20. In practice, the number of fins 20 is chosen as a function of the diameter of the portion 81 and of the flow rate set for the flow E. As appears more particularly from FIG. 2, each fin 20 is secured to a piston 21 mounted in a cylindrical body 22 having a circular base centered on an axis $X_{22}$ perpendicular to the wall 84. The piston 21 is equipped with seals 211 and 212 and is integral with a rod 23 that passes through a disk-shaped plate 24 slidably relatively thereto along the axis $X_{22}$. The plate 24 is equipped with seals 241 and 242 that co-operate with the seals 211 and 212 to prevent fluid flow between a chamber $C_{22}$ and the outside, which chamber $C_{22}$ is provided radially inside the body 22, between the plate 24 and the piston 21, and around the rod 23.

Figure 4:
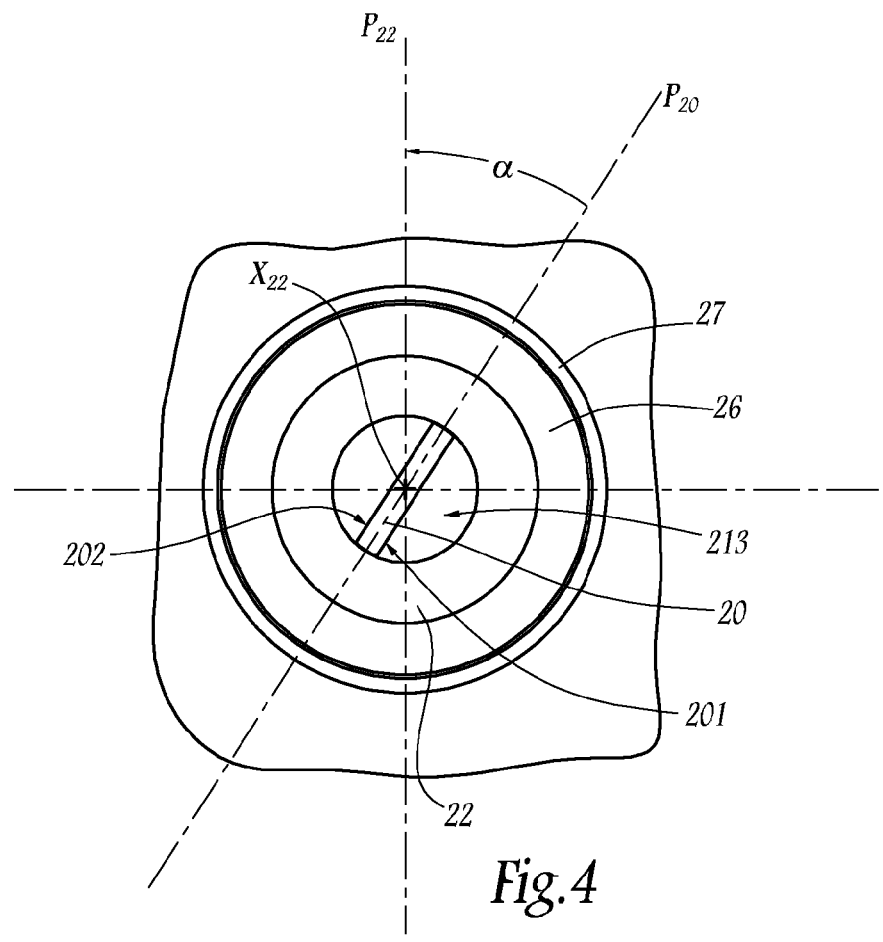
FIG. 4 is an end-on view, seen looking in the direction indicated by arrow $F_1$ in FIG. 2, of a pivotally moving fin in a position corresponding to the velocity distribution of FIG. 3.
Figure 5:
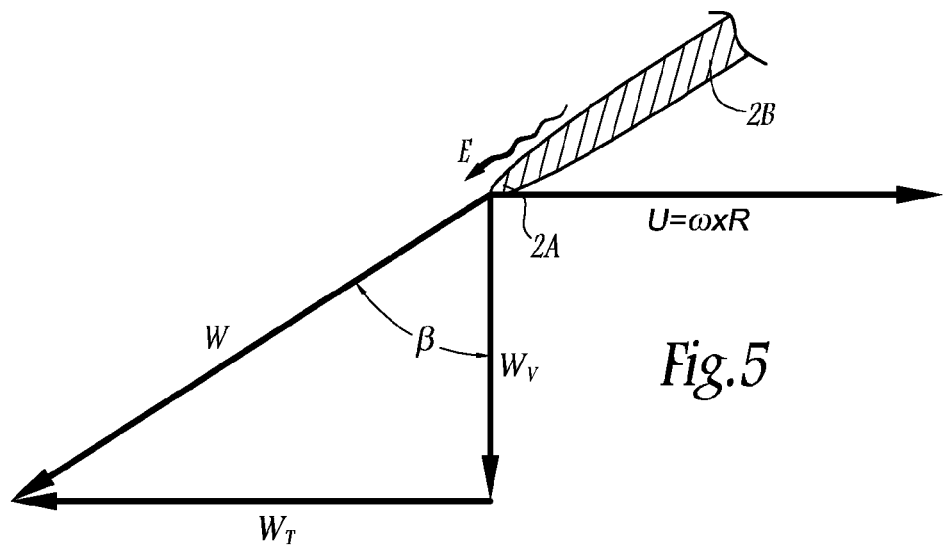
FIG. 5 is a diagrammatic view analogous to FIG. 3, while the installation is operating under other conditions.
Figure 6:
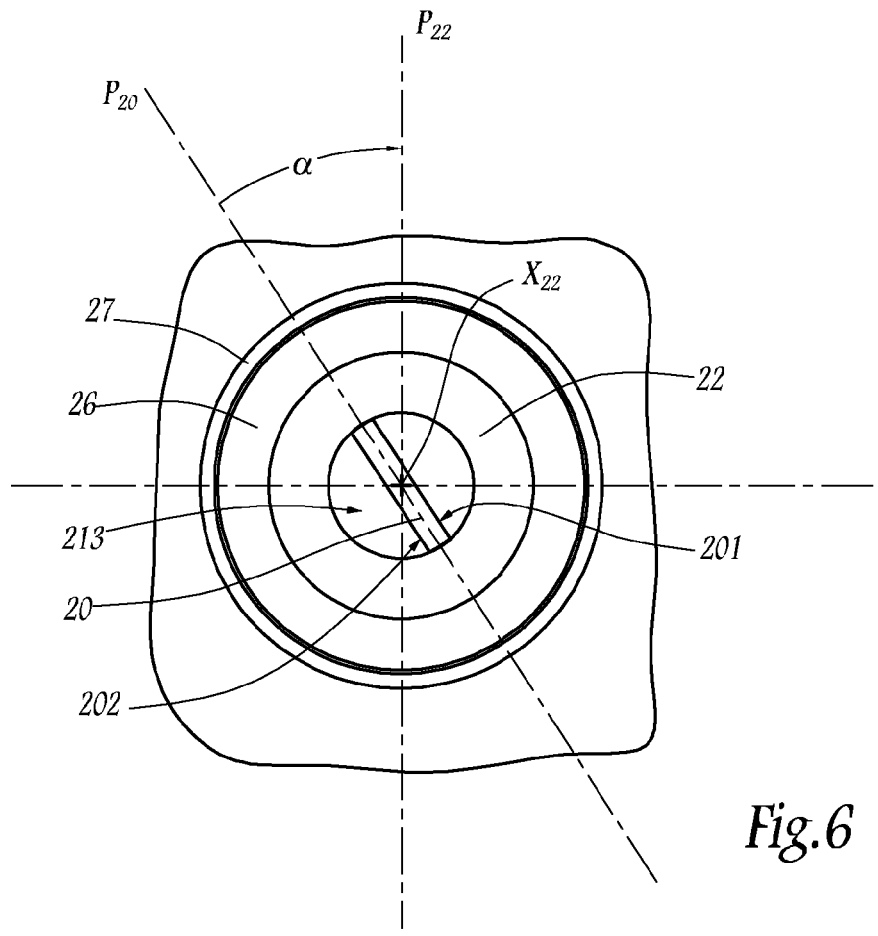
FIG. 6 is a view analogous to FIG. 4 while the installation is operating under the conditions shown in FIG. 5.

As appears from FIG. 4, each fin 20 extends on either side of the corresponding axis $X_{22}$. In practice, each fin 20 is centered on the axis $X_{22}$.

Figure 2:
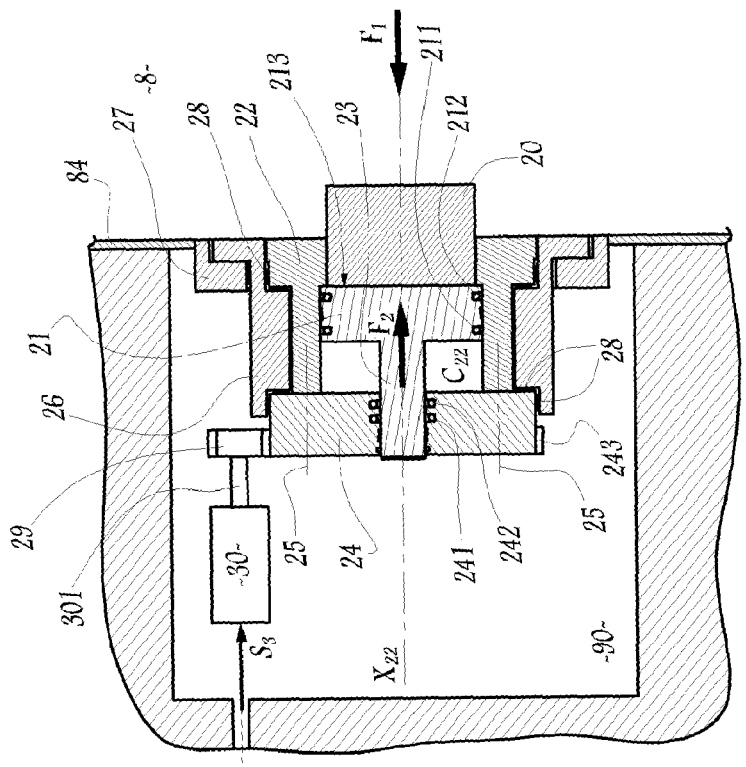
FIG. 2 is a view on a larger scale of the detail II of FIG. 1.

The plate 24 is fastened to the body 22 by means of screws 25 represented by their axis lines in FIG. 2.

The chamber $C_{22}$ is fed via a pipe (not shown) with water coming from the duct 5. This makes it possible to put the chamber $C_{22}$ under pressure, thereby pushing the piston 21 in the direction indicated by the arrow $F_2$ in FIG. 2, and causing the fin 20 to project towards the axis $X_2$ relative to the wall 84.

The subassembly formed by the parts 20 to 25 is mounted to pivot in rotation about the axis $X_{22}$, in a sleeve 26 held stationary in a ring 27 that is stationary relative to the wall 84. Bearing-forming seals may optionally be disposed radially around the body 22 and around the plate 24, to enable the above-mentioned subassembly to pivot in rotation relative to the sleeve 26.

In its portion that projects axially, along the axis $X_{22}$, relative to the sleeve 26, the ring 24 is provided with a radially outer set of teeth 243 that meshes with a cog 29 driven by the outlet shaft 301 of an electric servo-motor 30. This motor is controlled by the unit 10 by means of an electronic signal $S_3$.

The servo-motor 30 thus makes it possible to drive in rotation the subassembly made up of the parts 20 to 25 about the axis $X_{22}$ as a function of a control signal $S_3$ received from the unit 10.

This rotary drive makes it possible to vary the angular position of the fin 20 about the axis $X_{22}$. Each fin 20 is thus angularly positionable about an axis $X_{22}$. As appears from FIGS. 4 and 6, the fin 20 is in the form of a plane plate and its angular position can be specified by an angle α measured, above the axis $X_{22}$, between a midplane $P_{20}$ midway between the large side faces 201 and 202 of the fin 20 and a vertical plane $P_{22}$ containing the axis $X_{22}$.

The motor 30 makes it possible, for each moving fin 20, to adapt its angular position about the axis $X_{22}$ to suit the conditions of the flow E through the duct 8.

Figure 3:
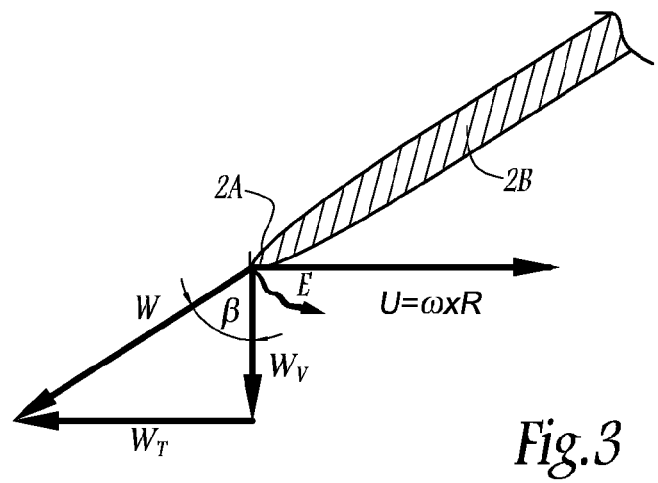
FIG. 3 is a developed diagrammatic view showing the distribution of the velocities in a first configuration of use of the installation of FIG. 1.

FIG. 3 is a developed view of the belt or "band" of the wheel 2, showing the distribution of the velocities in the vicinity of the trailing edge 2A of a blade 2B of the wheel 2. Considering that the wheel 2 rotates at an angular velocity ω, the tangential velocity U of the trailing edge 2A is then equal to ω×R, where R is the radial distance, or radius, between the edge 2A and the axis $X_2$.

In addition, considering the velocity W of the flow of water exiting from the wheel 2, said velocity W is in alignment with the blade 2B. This velocity W breaks down into a vertical component $W_V$, i.e. a component parallel to the axis $X_2$, and into a tangential component $W_T$.

In a configuration having a low flow rate Q for the flow E, as shown in FIG. 3, the vertical component of the velocity $W_V$ is relatively small, and, since the angle β of inclination of the velocity W relative to the vertical is set by the geometrical shape of the blade 2B, the tangential component $W_T$ of the velocity has a modulus $|W_T|$ that is less than the modulus $|U|$ of the tangential velocity of the blade. Under these conditions, the water that is ejected from the wheel 2 in the vicinity of the edge 2A has a tangential velocity component in the same direction as the tangential velocity U of the blade, i.e. directed rightwards in FIG. 3. The flow of water in the plane of this figure is represented by the arrow E.

In this situation, the water exiting from the wheel turns about the axis $X_2$ in the same direction as the rotation of the wheel 2.

This induces formation of turbulent vortex ropes in the duct 8, with large pressure fluctuations that can be corrected by the fins 20 if said fins are positioned correctly.

When the flow E has a high flow rate Q, the vertical component $W_V$ of the velocity W has a high modulus and, since the angle β is set by the geometrical shape of the blade 2B, the tangential component $V_T$ then has a modulus greater than the modulus of the tangential velocity U. In this situation shown in FIG. 5, the flow E is ejected towards the left of FIG. 5 and can be represented by the arrow E in this figure. In this situation, the flow turns in the opposite direction relative to the direction of rotation of the wheel 2, when said flow is ejected therefrom. In this situation too, turbulent vortex ropes are generated, with large pressure fluctuations, and this can be corrected by the fins 20.

Thus, depending on the value of the flow rate Q, the direction of rotation about the axis $X_2$ of the flow E through the draft duct 8 varies. The angular positions of the fins 20 make it possible to influence this swirling of the flow E in the following manner:

i) At low flow rate Q, if the operating point is such that the only objective is to reduce the pressure fluctuations without concern for the drop in efficiency, each fin 20 is caused to pivot through a positive angle α shown in FIG. 4, in order to slow down to as slow as possible the swirling flow of water through the draft duct 8.

ii) Also at low flow rate Q, if the operating point still has pressure fluctuations, but a lower level than in the situation i) considered above, then the fin 20 can be angularly positioned at a negative angle α shown in FIG. 4, in order to have a smaller negative impact on the efficiency of the installation, while also slightly reducing the pressure fluctuations.

iii) In a situation at a high flow rate Q, since the swirl direction of the flow in the draft duct is reversed, the reasoning for the above two operating points is also reversed.

To this end, the angle α formed by the fin 20 with the vertical may be adjusted to obtain the desired effect. If the fin is angularly positioned in a direction that is substantially parallel to the flow, the impact on efficiency is small. Conversely, if it is desired to reduce the pressure fluctuations considerably for an operating point, it is possible to cause the fin to pivot in such a manner that it opposes the flow. This reduction in pressure fluctuations has a relatively large negative effect on efficiency, but this negative effect exists only for the operating point in question, it being possible for the angular positioning angle α of the fins 20 about the axes $X_{22}$ to be readjusted differently for the other operating points.

Thus, the angular positioning angle α of each fin 20 is adjusted in such a manner as to obtain the best compromise between pressure fluctuations and efficiency.

When the flow rate of the flow E and the velocity of rotation of the wheel 2 are such that the modulii $|W_T|$ and $|U|$ of the tangential velocities are equal, i.e. when the flow E is substantially vertical on exiting from the wheel 2, the fins 20 are disposed such that their respective midplanes $P_{20}$ are vertical, i.e. the angle α takes the value of zero.

The angular positioning of the fins 20 about their pivot axes $X_{22}$ can be adjusted empirically, by verifying a posteriori the influence of that positioning on the efficiency of the installation I and the level of pressure fluctuations.

Advantageously, the unit 10 automatically controls the angularly positionable fins 20 as a function of a signal $S_4$ delivered by a flow-rate sensor 12 installed on the duct 5. This flow-rate sensor may be of any suitable type, e.g. based on differential pressure sensors. To a first approximation, and considering that the wheel 2 rotates at a substantially constant velocity, as applies in machines equipped with a synchronous alternator, it is possible, in the unit 10, to compute the tangential velocities $W_T$ and U, on the basis of the flow rate Q of the flow E, and, based on that computation, to determine the outlet direction of the flow E relative to the direction of rotation of the wheel, namely in the same direction or in the opposite direction. The unit 10 is then capable of determining the angular positioning that should be given to the fins 20 about their respective axes $X_{22}$ in order to stabilize the flow E.

In a variant, or in addition, it is possible to mount a tachometer 14 on the shaft 3 and to deliver a signal $S_5$ to the unit 10 that is representative of the velocity of rotation of the shaft 3, thereby making it possible to determine accurately the value of the tangential velocity U. This signal $S_5$ can be integrated by the unit 10 in order to determine the angle of inclination α to be given to each of the fins 20 in order to stabilize the flow E in the draft tube 8.

Each sleeve 26 is screwed into a ring 27 and, when maintenance work needs to be done on one of the subassemblies 20-25, it suffices to unscrew the corresponding sleeve 26 from the ring 27 in order to have access, from the upstream portion 81 of the duct 8, to the component elements of said subassembly. The elements for supporting and positioning the fins are disposed in a recess 90 provided in the concrete structure of the installation, radially outside the wall 84, as shown in FIG. 2 only.

Figure 7:
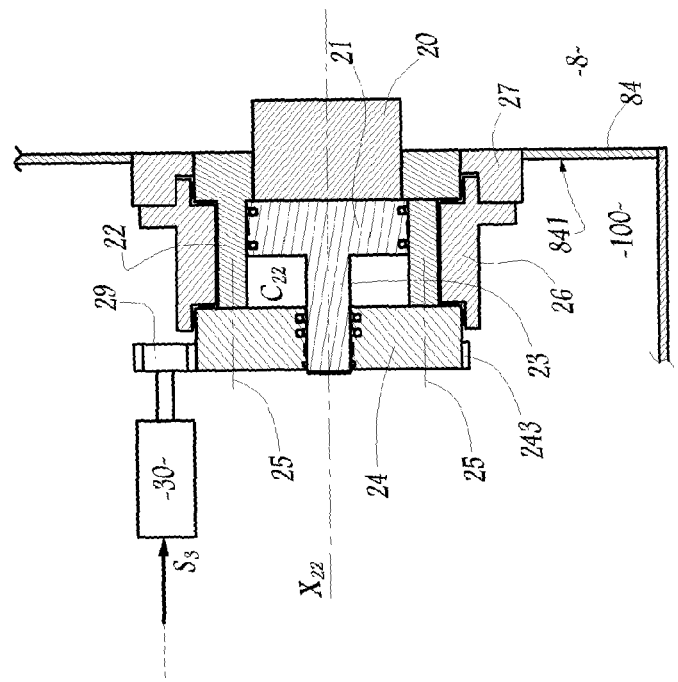
FIG. 7 is a view analogous to FIG. 2 for a second embodiment of an installation of the invention.

In a variant, and as shown in FIG. 7, a gallery 100 giving access to the outside face 841 of the wall 84 may be provided radially about the portion 81 of the duct 8, thereby making it possible to perform maintenance operations on the fins 20 and on their drive members from said gallery. The shape of the sleeve 26 and the shape of the ring 27 are then adapted.

In this FIG. 7, elements analogous to the elements of the first embodiment bear like references, and a fin 20 is secured to a piston 21 that is extended by a rod 23 sliding in a plate 24 that is secured to a body 22 by means of screws 25. A sleeve 26 surrounds the subassembly formed by the parts 20 to 25 and is screwed into a ring 27, from the gallery 100. A servomotor 30 drives a cog 29 meshed with an outside set of teeth 243 on the plate 24, thereby making it possible to control the angular positioning of the fin 20 about an axis $X_{22}$ perpendicular to the wall 84, as explained for the first embodiment.

In both of the embodiments, the feed pressure at which the chamber $C_{22}$ is fed makes it possible to control the positions of the piston 21 and of the fin 20 along the axis $X_{22}$. In particular, when the flow through the duct 8 is stabilized, it is possible not to feed the chamber $C_{22}$ with pressurized water, so that the fin 20 is retracted or pushed in relative to the wall 84, to the outside of the duct 8, due to the pressure of water on the face 213 of the piston 21 that faces towards the duct 8.

In a variant, the position of each fin along its axis of rotation $X_{22}$ may be controlled by means other than a pressure chamber fed with water. For example, for this purpose, it is possible to use an electric servo-motor or a hydraulic, mechanical, or electrical actuator.

The above-mentioned piston 21, the above-mentioned servo-motor or the above-mentioned actuator thus makes it possible to control the retraction of each fin 20 into the wall 84, while taking account of a parameter representative of the flow E, as mentioned above as regards the angular positioning of the fins.

The above-described invention is shown in the figures in the situation in which the pivot axes $X_{22}$ of the fins 20 are perpendicular to the wall 84. This is not essential, and it suffices for the axes $X_{22}$, which are stationary relative to the wall 84, to intersect said wall. In practice, if the axis $X_{22}$ is not perpendicular to the wall 84, the acute angle that it forms with said wall is chosen to be greater than 45°, preferably greater than 75°, and more preferably greater than 85°.

The invention is shown in two embodiments, with a servomotor associated with each fin 20, thereby making it possible to control the fins individually. The movement of the fins is synchronized by the unit 10 and by its management of the various signals $S_3$ for the various motors 30.

In a variant, it is possible to use mechanical means interconnecting the fins 20, thereby making it possible to control the fins in grouped manner. It is possible, for example, to use chains or a gate operating ring, as is known, for example, for controlling the wicket gates 61.

Other devices may be considered for pivoting the fins 20, with individual or grouped control. In practice, the fins may be pivoted by any suitable actuator, e.g. a rotary or linear actuator associated with a connecting rod. The actuators may be actuated by oil, by electric current, by compressed air, or by water. The solution using water-driven actuators is preferred, in view of the working environment of said actuators.

The invention is shown as applied to a Francis-type turbine. However, it is also applicable to other types of turbine, such as Kaplan turbines and propeller-type turbines, and also to pump turbines.

The invention is shown in the situation in which all of the fins are angularly positionable, i.e. mounted to pivot in rotation about axes that are secant, in particular, perpendicular, to the wall of the discharge duct. In a variant, only certain fins are angularly positionable.

In a variant of the invention that is not shown, the invention may be implemented while the wheel of the turbine is equipped with a tip for improving guiding of the flow downstream from the wheel, e.g. a tip known from WO-A-2005/038243.

The invention is described above in the situation in which the flow rate of the flow E is used to determine the angular positioning of the fins 20. However, other parameters may be taken into account for this purpose, in particular the fall head H across the installation, the power P delivered by the installation or the velocity of rotation ω of the wheel 2.

In a variant, the fins 20 may have a shape other than a plane shape.

The invention claimed is:

1. An installation for converting hydraulic energy into electrical energy, which installation comprises a hydraulic turbine, a feed duct for feeding a forced flow of water to the turbine, a discharge duct for removing the flow exiting from the turbine, and guide fins for guiding the flow through the discharge duct, said installation being characterized in that each guide fin is mounted to pivot in rotation about an axis that intersects the wall of the discharge duct, in that the installation is provided with means for controlling the angular position of the fin about its pivot axis, in that each pivotally moving fin is retractable into the wall of the discharge duct, and in that the installation is provided with means suitable for adjusting the extent to which the fin is retracted into the wall.

2. An installation according to claim 1, wherein the control means are suitable for setting the angular position of the guide fin as a function of at least one parameter representative of the flow.

3. An installation according to claim 1, wherein the or each pivotally moving fin is removable from the wall of the discharge duct, from inside said duct.

4. An installation according to claim 1, wherein it is further provided with a gallery giving access to the outside face of the wall of the discharge duct, and wherein the or each fin is removable from said wall, from the gallery.

5. An installation according to claim 1, wherein each fin is secured to a piston mounted to slide parallel to the pivot axis of the fin, relative to a part fastened to the wall, wherein a subassembly comprising the fin and the piston is mounted to be pivotable in rotation about the pivot axis of the fin, and wherein said subassembly further comprises means for co-operating with drive means for driving the subassembly in rotation about the pivot axis of the fin.

6. An installation according to claim 1, wherein each moving fin extends on either side of its pivot axis.

7. A method of controlling an installation for converting hydraulic energy into electrical energy, which installation comprises a hydraulic turbine a feed duct for feeding a forced flow of water to the turbine, a discharge duct for removing the flow exiting from the turbine and guide fins for guiding the flow through the discharge duct, wherein said method comprises a step consisting in controlling the angular position, about an axis that intersects the wall, of the discharge duct of each guide fin for guiding the flow through the discharge duct and a step consisting in controlling the extent to which each moving fin is retracted into the wall of the discharge duct.

8. A method according to claim 7, wherein the angular position of the fin is controlled as a function of at least one parameter representative of the flow, in particular as a function of the flow rate of the flow.

9. A method according to claim 7, wherein the installation is provided with a plurality of fins distributed over the wall of the discharge tube and the position of the fins is controlled in grouped manner.

10. A method according to claim 7, wherein the installation is provided with a plurality of fins distributed over the wall of the discharge tube and the position of each fin is controllable individually.

11. A method according to claim 7, wherein the extent to which each moving fin is retracted into the wall of the discharge duct is controlled by feeding or by not feeding pressurized water coming from the feed duct to a chamber provided in a body that is part of a subassembly, and defined by a piston that is secured to the fin.

\* \* \* \* \*